(12) United States Patent
Chaurasia et al.

(10) Patent No.: US 8,886,672 B2
(45) Date of Patent: Nov. 11, 2014

(54) PROVIDING ACCESS IN A DISTRIBUTED FILESYSTEM

(75) Inventors: Ashish Chaurasia, Pune (IN); Venkateswararao Jujjuri, Beaverton, OR (US); Ujjwal Lanjewar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 12/402,764

(22) Filed: Mar. 12, 2009

(65) Prior Publication Data

US 2010/0235396 A1 Sep. 16, 2010

(51) Int. Cl.
*G06F 17/30* (2006.01)
*H04L 29/06* (2006.01)
*G06F 21/62* (2013.01)

(52) U.S. Cl.
CPC ............ *H04L 63/126* (2013.01); *H04L 63/102* (2013.01); *G06F 21/6218* (2013.01)
USPC ........................................................ 707/783

(58) Field of Classification Search
CPC ................................................ G06F 17/30091
USPC .......................... 707/821, 822, 781, 783, 785
See application file for complete search history.

(56) References Cited

U.S. PATENT DOCUMENTS

| | | | |
|---|---|---|---|
| 5,764,889 A * | 6/1998 | Ault et al. | 726/17 |
| 5,933,826 A * | 8/1999 | Ferguson | 1/1 |
| 6,092,203 A | 7/2000 | Ooki | |
| 6,105,027 A | 8/2000 | Schneider et al. | |
| 6,125,447 A | 9/2000 | Gong | |
| 6,289,462 B1 * | 9/2001 | McNabb et al. | 726/21 |
| 6,308,273 B1 | 10/2001 | Goertzel et al. | |
| 6,405,202 B1 * | 6/2002 | Britton et al. | 1/1 |

(Continued)

FOREIGN PATENT DOCUMENTS

| | | |
|---|---|---|
| CN | 1149797 A | 5/1997 |
| JP | 2002518720 A | 6/2002 |

(Continued)

OTHER PUBLICATIONS

Chander, A.; Dean, D.; Mitchell, J.C.; , "A state-transition model of trust management and access control," Computer Security Foundations Workshop, 2001. Proceedings. 14th IEEE , vol., No., pp. 27-43, 2001 doi 10.1109/CSFW.2001.930134.*

(Continued)

*Primary Examiner* — Alexey Shmatov
*Assistant Examiner* — Grace Park
(74) *Attorney, Agent, or Firm* — Kali Law Group, P.C.

(57) ABSTRACT

A system and method for providing access in a distributed filesystem. The disclosure describes systems and methods for providing access to filesystem objects in a distributed filesystem (DFS). In one implementation, access to filesystem objects in the DFS can be restricted to only authenticated users and client devices. To this end, the client devices of the DFS can be divided into trusted and non-trusted clients, and further access can be denied to non-trusted clients. Concepts of trusted computing can be utilized to obtain trusted clients. New clients added to the system can be added as non-trusted clients. Further, access can be restricted by extending the file access permissions to include additional bits that can control access to non-trusted clients. In certain situations, the owner of the object can be allowed access to the object from a non-trusted client.

19 Claims, 6 Drawing Sheets

(56) References Cited

U.S. PATENT DOCUMENTS

| | | | |
|---|---|---|---|
| 6,714,930 | B1* | 3/2004 | Garrison et al. .................. 1/1 |
| 7,076,795 | B2 | 7/2006 | Hahn |
| 7,676,845 | B2* | 3/2010 | Thomas et al. ................ 726/26 |
| 7,827,598 | B2* | 11/2010 | Moran et al. .................... 726/4 |
| 2003/0050962 | A1 | 3/2003 | Monsen |
| 2003/0135545 | A1* | 7/2003 | Fujii et al. ..................... 709/203 |
| 2004/0193919 | A1* | 9/2004 | Dabbish et al. ................ 713/201 |
| 2004/0236961 | A1* | 11/2004 | Walmsley ..................... 713/200 |
| 2004/0250113 | A1* | 12/2004 | Beck ............................. 713/201 |
| 2005/0240901 | A1* | 10/2005 | McKnight ..................... 717/110 |
| 2006/0064759 | A1* | 3/2006 | Agranat ........................ 726/26 |
| 2006/0089909 | A1* | 4/2006 | McLeod et al. ............... 705/44 |
| 2006/0114917 | A1* | 6/2006 | Raisch .......................... 370/401 |
| 2006/0117378 | A1* | 6/2006 | Tam et al. ..................... 726/3 |
| 2006/0294580 | A1 | 12/2006 | Yeh |
| 2007/0118902 | A1* | 5/2007 | Focke et al. .................. 726/22 |
| 2007/0214497 | A1* | 9/2007 | Montgomery et al. ........ 726/4 |
| 2008/0089295 | A1 | 4/2008 | Keeler |
| 2008/0313417 | A1* | 12/2008 | Kim et al. ..................... 711/163 |
| 2010/0010998 | A1* | 1/2010 | Wagner ......................... 707/9 |
| 2011/0035787 | A1* | 2/2011 | Naslund et al. ............... 726/3 |

FOREIGN PATENT DOCUMENTS

| | | |
|---|---|---|
| JP | 2002342144 A | 11/2002 |
| JP | 2003248658 A | 9/2003 |
| WO | WO9840992 A1 | 9/1998 |
| WO | WO9930217 A1 | 6/1999 |
| WO | WO9965207 A1 | 12/1999 |

OTHER PUBLICATIONS

Muller, Thomas. "Bluetooth Security Architecture Version 1.0." Bluetooh white paper. Jul. 15, 1999.*

A trust based delegation system for managing access control (2005) by Rainer Steffen, Rudi Knorr in Advances in Pervasive Computing: Adjunct Proc. Pervasive 2005.*

Windows Integrity Mechanism Design. http://web.archive.org/web/20081218064728/http://msdn.microsoft.com/en-us/library/bb625963.aspx.*

Emery, "Distributed Authentication System (DAS) Handbook", http://www.vanemery.com/DAS/DASmanual.html.

Blaze, "A Cryptographic File System for Unix", 1st ACM Conf on Comm & Computing Sec., Fairfax, VA, Nov. 1993, 8 pp.

Unix Power Tools, "File Access Permissions", Ch.1, Sec. 1.23, Intro., 4 pp. http://docstore.mik.ua/orelly/unix/upt.ch01$_{13}$ 23.htm.

Steiner, et al., "Kerberos Overview—An Authentication Service for Open Network Systems", CISCO 2006, Doc. ID16087.

Westphal, "NFS and NIS Security", Jan. 2001, 4 pp. http://www.symantec.com/connect/articles/nfs-and-nis-security.

"NFS Overview, FAQ and Howto Documents", 24 pp. http://nfs.sourceforge.net/.

Findlay, "Security with LDAP", Jan. 2002, 16 pp., http://www.skills-1st.co.uk/papers/security-with-ldap-jan-2002/security.

"IBM TotalStorage SAN File System", International Business Machines Corporation, 3 pp.

"Trusted Computing", Wikipedia, 12 pp.

Moffett, et al., "Specifying Discretionary Access Control Policy for Distributed Systems", (Nov. 1990) Computer Communications, Dept of Computing, Imperial College, London UK, vol. 13, No. 9, pp. 571-80.

Sandhu et al., "Access Control: Principles and Practice", (Sep. 1994) IEEE Comm. Magazine, No. 9, New York, 9 pp.

International Search Report and Written Opinion of the ISA, PCT/EP2010/052518, mailed 11 May 2010. 9 pp.

\* cited by examiner

PROVIDING ACCESS IN A DISTRIBUTED FILESYSTEM

BACKGROUND

Filesystems are typically databases for the storage, hierarchical organization, manipulation, navigation, access, and retrieval of data. Distributed Filesystems (DFSs), a version of filesystems, have become increasingly widespread over the last few decades. A DFS, as the name suggests, is a network filesystem where a single filesystem can be distributed across several physical computing devices, and the computing devices can have direct access to a part of the entire filesystem. The DFS generally includes facilities for transparent replication and fault tolerance. That is, when a limited number of nodes in a filesystem go offline, the system continues to work without any data loss. Therefore, the DFS has become a very popular choice for local area networks (LAN) in organizations, corporations, and so on.

In typical computer operating systems, files are stored with associated access permissions and users with sufficient access permissions are allowed to access the files. Conventionally, file access permissions are granted on three levels (i.e., owner, group, and other users). Each level can have its own permissions, and users can be granted access based on their level's access permissions. In addition, in most filesystems, each file has an associated owner identification (ID) (i.e., the ID of the user who created the filesystem object), and group ID (i.e., the owner can be part of one or more groups). The present file access permissions reduce chances of security breach (to a large extent) for local filesystems, where multiple users can access files from the same machine, but in distributed filesystems, the file access permissions can introduce vulnerabilities.

In DFSs, multiple users present on different computing devices can access a single filesystem object. Therefore, the file access permissions create certain problems in DFSs. These problems occur because in DFSs it is not necessary for user IDs to be unique on all the computing devices in the system. For example, two users (such as user A and user B) can have the same user ID (such as ID 1000), on different client devices. So, when user A attempts to access a file created by user B, user A will be allowed access to the file (based on the owner access permissions of the file), even though user A did not create the file. The system permits this action as the file access permissions simply recognize user IDs, and since both the users have the same user ID, both user A and user B are recognized as owners of the file. Therefore, an authentic user can easily be faked, which can cause serious security threats.

Various methods have been proposed to overcome some of the security issues in DFSs. Some methods centralize the user IDs and group IDs in a central repository, which ensures that no two users have the same user ID. Each time a user requests access to a file object, the user's credentials are verified against the repository. However, it is still possible to bypass the central repository and install a client device in the LAN. Further, a user can still fake a user ID on the new installed client device. In addition, since all riser IDs are stored in a central server, the entire system can crash if the central repository crashes.

Other methods involve the use of public and private encryption keys. These methods also use a central repository, along with the encryption keys. Once a user is authenticated by the central repository, an additional level of security is added that requires an encryption key. Access is denied if the user does not possess the key. These systems can be very complex and require extensive training of administrators. Further, like the other methods known in the art, this method too has a single point of failure.

SUMMARY

Embodiments of the invention are directed to methods and systems for providing access to filesystem objects in a distributed filesystem.

In a first embodiment, a method for providing access in a Distributed Filesystem (DFS) is described. The method includes the steps of retrieving a user identification (ID) and a client ID of a requesting user and determining whether the client ID corresponds to a trusted client or a non-trusted client. The method further includes obtaining extended access permissions of a filesystem object and allowing access to the filesystem object based on the user ID, the client ID, and the extended access permissions of the filesystem object. The extended access permissions of the object can include a T bit that indicates whether the filesystem object was created on a trusted client, and an L bit that indicates whether the requesting user is allowed to access the filesystem object from a non-trusted client.

In a second embodiment, a system for providing access in a DFS is described. The system includes a memory and a processing device that are operatively coupled to retrieve a user ID and a client ID of a requesting user and determine whether the client ID corresponds to a trusted client or a non-trusted client. Moreover, the system obtains extended access permissions of a filesystem object, where the extended access permissions can include a T bit that indicates whether the filesystem object was created on a trusted client, and an L bit that indicates whether the requesting user is allowed to access the filesystem object from a non-trusted client. Further, the system allows access to the filesystem object based on the user ID, client ID and the extended access permissions of the filesystem object.

DETAILED DESCRIPTION

The following detailed description is made with reference to the figures. Preferred embodiments are described to illustrate the claimed invention, not to limit its scope, which is defined by the claims. Those of ordinary skill in the art will recognize a variety of equivalent variations of the description that follows.

An embodiment of the claimed invention describes a method for providing access in a distributed filesystem (DFS). The method allows authentic users to access filesystem objects. Further, the method allows users to access filesystem objects from authentic client devices. Another embodiment of the claimed invention uses a combination of user identification (ID) and client ID, to recognize unique users. Further, the concept of trusted computing is utilized in the claimed invention. In one embodiment, filesystem access permissions can be extended in order to enhance the security of objects in the distributed filesystem.

Exemplary Operating Environment

Figure 1:
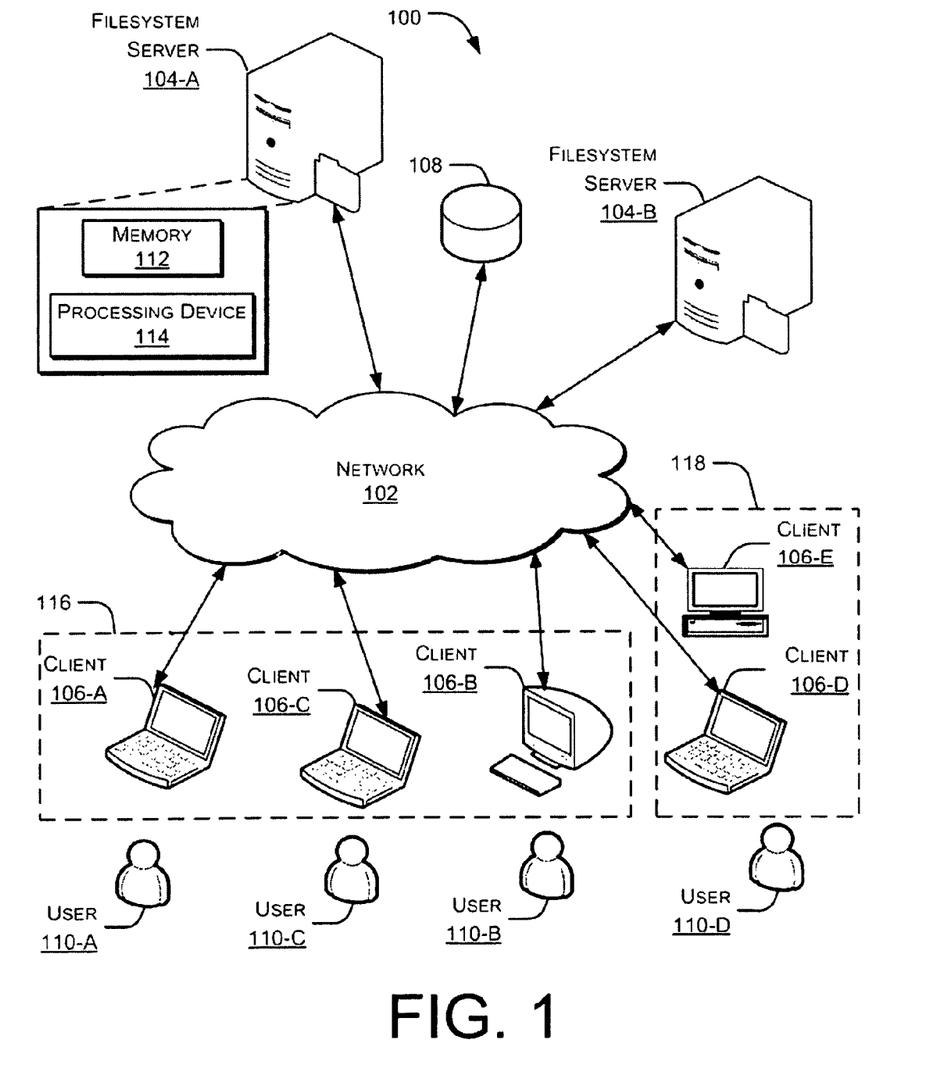
FIG. 1 is a block diagram illustrating an exemplary distributed filesystem (DFS) in which the claimed invention may operate.

FIG. 1 is a block diagram illustrating an exemplary Distributed FileSystem (DFS) 100 in which the claimed invention may operate. The DFS 100 includes a network 102 that interconnects one or more filesystem server computing devices 104-A, 104-B (filesystem servers 104), one or more client computing devices 106-A, 106-B, 106-C, and 106-D (clients 106), and a central repository 108. Further, one or more users 110-A, 110-B, 110-C, and 110-D (users 110) can access objects stored on the filesystem servers 104, from the clients 106, through the network 102. Filesystem objects can include files, directories, folders, documents, and other similar objects commonly stored on digital media.

In the DFS 100, various filesystems can be distributed across the filesystem servers 104, which can be located in different geographical locations, but can logically be mapped under a root DFS folder. Therefore, the users 110 are not required to know the exact location of the filesystem servers 104. Further, the DFS 100 can include facilities for transparent replication and fault tolerance so that when a limited number of the filesystem servers 104 go offline, the DFS 100 continues to work without any data loss.

The network 102 may be any wired or wireless network known in the art. For example, the network can be a local area network (LAN), a metropolitan area network (MAN), the Internet, and so on. In one embodiment, the network 102 is a private network, such as a company network, connecting a plurality of office PCs, various servers, and other computing-based devices spread throughout several countries. Alternately, the network 102 includes a home network with a limited number of PCs belonging to a single family, connected over a WLAN. In other embodiments, the network 102 can connect a limited number of clients in a small business. It will be appreciated that the type of network will not limit the scope of the invention, and any known network configuration can be used to implement the DFS 100.

Further, the DFS 100 can function on any operating system known in the art, such as the IBM AIX® operating system, the Solaris Filesystem, the Linux filesystem, the Microsoft Windows® operating system, the MAC operating system, and so on. Embodiments of the claimed invention are described with reference to a UNIX operating system, though any operating system known in the art can be utilized instead.

Moreover, the filesystem servers 104 and the clients 106 can be equipped with a memory, a processing device, input/output ports, networking ports, and so on. In FIG. 1, the filesystem server 104-A is depicted with a memory 112 and a processing device 114. The processing device 114 may include microprocessors, microcomputers, microcontrollers, digital signal processors, central processing units, state machines, logic circuitries, and/or any devices that manipulate signals based on operational instructions. Among other capabilities, the processing device 114 is configured to fetch and execute computer-readable instructions stored in the memory 112. The memory 112 can include any computer-readable medium known in the art including, for example, volatile memory (e.g., RAM) and/or non-volatile memory (e.g., flash, etc.). The memory 112 and the processing device 114 can have any suitable physical implementation and they can be operatively coupled depending on the particular device implementation. These components can be adapted, arranged, configured, and designed to perform methods in accordance with the teachings herein, for example, as illustratively described by reference to FIGS. 2-6. It will be apparent to people of ordinary skill in art that each of the clients 106 and the filesystem servers 104 can be equipped with a memory and a processing device.

Further, embodiments of the claimed invention restrict access to users on unauthorized clients (i.e. clients not recognized by the DFS 100), and allows access to authorized users on unauthorized clients. To this end, all the clients 106 are divided into two groups, namely trusted clients and non-trusted clients, according to principles of trusted computing.

Trusted Computing (TC) is a technology developed and promoted by the Trusted Computing Group. With Trusted Computing, the clients 106 consistently behave in specific ways enforced by hardware and software. Enforcing trusted behavior is achieved by loading the hardware with a unique ID and a unique master key and denying knowledge and control of the master key to even the owner of a client. Trusted Computing not only secures the hardware for the owner, but against the owner as well, thereby prohibiting users from faking authorized users. Many techniques are known in the art for implementing Trusted Computing, such as Network Filesystem (NFS). Network Information Service (NIS). Lightweight Directory Access Protocol (LDAP), and so on. Any of the known techniques can be used to implement TC.

In one implementation, NIS can be utilized. In NIS, the client IDs are stored in a central repository, such as the central repository 108. Each client has a list of user IDs it can support. Since the client IDs are centrally stored, the NIS ensures that no two clients have the same user IDs, thereby ensuring unique user IDs. A new client installed in the network 102 that tries to access the filesystem servers 104 is treated as a non-trusted client, as NIS is not sure whether the client has unique user IDs. Once NIS configures the client and the user IDs on the client are in agreement with the user IDs on the trusted clients, the client can be upgraded to the trusted client group.

FIG. 1 illustrates trusted clients 116 and non-trusted clients 118. The trusted clients 116 include clients 106-A, 106-B, and 106-C, and the non-trusted clients 118 include clients 106-D, 106-E. In one implementation, the trusted clients 116 and the non-trusted clients 118 can be included in a list of clients stored in the memory 112 of the filesystem servers 104. In another implementation, the list of clients can be stored in the central repository 108. Further, new clients in the network 102 can be directly added to the non-trusted clients 118. Once NIS authenticates the user IDs, the clients can be upgraded to the trusted clients 116.

When a user requests for a filesystem object on the DFS 100, the NIS verifies the user's client ID against the list of clients. If the user's client ID is not present in the list of clients, the NIS does not allow access to the user 110. In case the client ID is present in the list of clients, the filesystem server 104 confirms if the user 110 has presented the correct user ID. Based on the confirmation, the user ID is checked against, the access permissions of the filesystem object.

In this manner, embodiments the claimed invention ensures that the users 110 can have unique identification and clients that are not part of the unique identification scheme can be the non-trusted clients 118. The separation of the trusted and non-trusted clients allows the filesystem servers 104 to allow authentic users on the trusted clients 116 to access the filesystem server 104 and at the same time deny access to fake users on the non-trusted clients 118.

Moreover, a number of techniques can be utilized to uniquely identify the users 110. In one implementation, users can be identified by using a combination of user ID and client ID, where the client ID corresponds to the client that the user typically operates on. The combination of the user ID and the client ID can be in any form, such as numerical values, alphanumeric, values, user names, MAC addresses, user personal information, and so on. In another implementation, any unique ID such as a numeric value, an alphanumeric value, etc., can be considered as a user ID.

Therefore, according to embodiments of the claimed invention, access to filesystem objects is based on the user ID, the client ID, and the access permissions of a filesystem object. Since, the users are defined not only by their user IDs, but also their respective locations (if the user is on a trusted or a non-trusted client), the conventional access permissions of the objects have to be modified in order to provide different access permissions based on the location of the user. To this end, embodiments of the claimed invention add some new bits to the access permissions of the current filesystems and overload the existing access permission bits. An explanation of extended access permissions is provided in conjunction with FIG. 3.

Conventional Access Permissions

The following sections describe conventional file access schemes as some prior knowledge about the conventional access permissions is required to understand the extended access permissions of the claimed invention. The conventional access permissions will be explained with reference to the UNIX operating system. However, it will be appreciated that conventional access permissions can be explained with reference to any other operating system known in the art. Each operating system has its own syntax, commands, file names, etc., but the basic concept of conventional access permissions remains the same in typical operating systems.

In UNIX, a user ID and at least one group ID can be used to identify a user. Furthermore, users in one group can be classified under one group ID. For example, an organization can have various teams, such as a financial team, a human resources team, an IT team and so on. The members of the financial team can be grouped under a financial group ID, the human resources team can be grouped under a human resources group ID, and so on. Further, the managers of the teams can be organized under an executive group ID. An administrator or a root user can manage the group IDs. Typically, all filesystem objects include the user ID of the owner that created the filesystem object and the group ID of the group to which the owner belongs.

Conventional access permissions can be permissions such as read, write, and execute permissions for different levels of users, such as owner of the object, group member, or any other user. UNIX typically assigns 9-bit access permissions, which can be depicted as three octal digits. Each octal digit represents permissions for the owner, the group member, or any other user respectively. The first octal digit represents the access permissions for the owner of the object, the next octal digit represents the access allowed for members of a group to which the owner belongs, and the last octal digit represents access permissions for any other user. Further, each binary bit of the octal digit can represent individual permissions, such as read, write, and execute permissions. The first bit indicates read permission, the second bit indicates write permission, and the third bit indicates execute permission. If the bit value is 1, the permission is activated, else, the permission is blocked. For example, an octal digit 7 has a binary value of 111, which indicates that the user has read, write, and execute permissions for the filesystem object.

An authorized user, such as the owner of the object or an administrator, typically assigns the access permissions. In some situations, the access permissions can be preset for processes, or an environment, so all the objects created in that process or environment will automatically have the access permissions assigned to that process or environment. An authorized user can modify the access permissions of an object at any time after its creation.

In the UNIX system, the conventional access permissions are stored in a metadata file called inode, which stores basic information about a regular file, directory, or other filesystem object. Each filesystem object can have an inode and an inode number (often referred to as an "i-number" or "inode") that can identify the inode in the filesystem and where it resides.

Typically inodes store information about filesystem objects, such as the user ID of the owner, and the group ID, access permissions (read, write, execute permissions) and type of object. Further, the inode number indexes a table of inodes in a known location on the device; from the inode number, the kernel can access the contents of the inode and the contents of the filesystem object. Conventionally, the kernel searches a directory looking for a particular filename and then converts the filename to the correct corresponding inode number.

The DFS 100 has a number of filesystems, and in certain embodiments, the filesystems can be of different types, such as the Solaris® filesystem, the Linux® filesystem, the Windows® filesystems, the Mac OS filesystems, the UNIX® filesystems, and so on. Each of the filesystem servers 104 can have their own manner of storing the metadata about the filesystem objects. In order to for a user to seamlessly access the objects from different filesystems, a virtual filesystem (VFS) abstraction layer can be present on top of the filesystem servers 104 in the DFS 100.

Exemplary Virtual Filesystem

Figure 2:
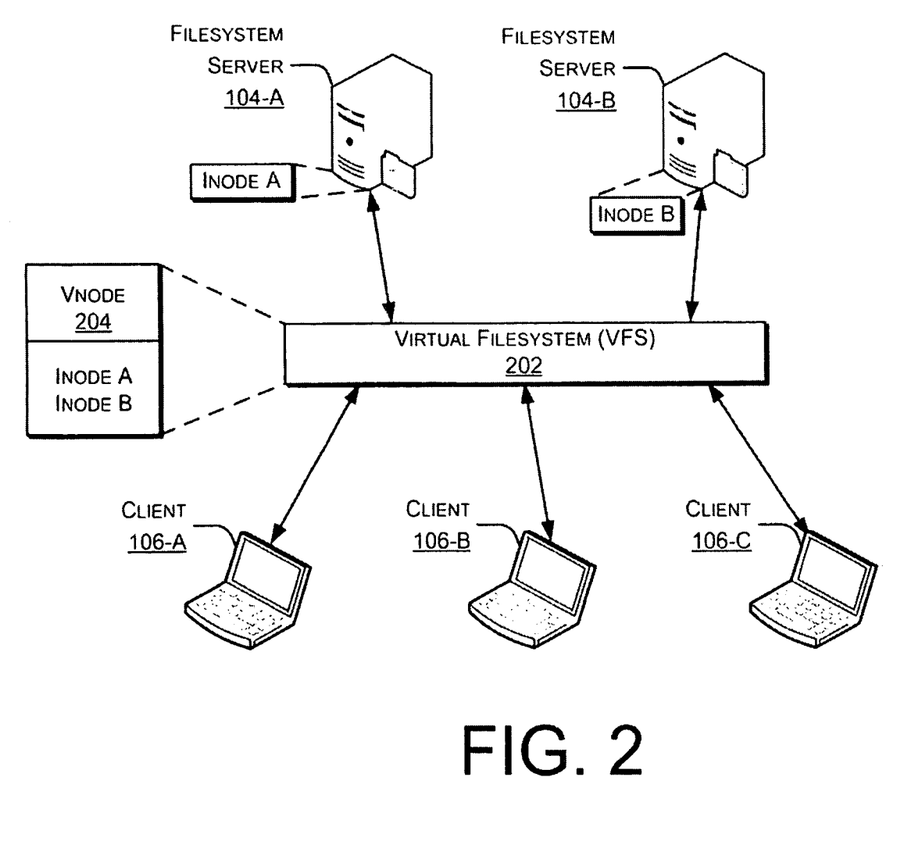
FIG. 2 illustrates a block diagram of a virtual filesystem of some embodiments of the claimed invention.

FIG. 2 depicts a VFS 202 and its relation with the various filesystem servers 104. The VFS 202 can allow the clients 106 to access different types of the filesystem servers 104 in a uniform manner. Moreover, the VFS 202 can, for example, be used to access local and network servers transparently without the clients 106 noticing the difference. In one implementation. The VFS 202 bridges the differences in various filesystems, so that the clients 106 can access objects on the filesystems without having to know the type of filesystem.

To retrieve the modes of different filesystems, the VFS 202 uses a data structure called a vnode 204. All file manipulations can be done with the vnode 204, which includes public and private data. The public data fields in each vnode 204 either include data that is manipulated only by the VFS 202 layer or data about the filesystem object that does not change over the life of the filesystem object, such as the file type. The private data fields in the vnode 204 point to data that is dependent on the filesystem, such as the inode table of the filesystem. The vnode 204 is depicted with inode table entries of the filesystem servers 104.

The vnode 204 of the filesystem can point to inode numbers of the filesystem objects of a particular filesystem server 104. Therefore, in the DFS 100, the access permissions of objects can be accessed through the vnode and/or the inode of the filesystem object. Further, the access permissions field in the inode is typically a 16-bit field. Presently, 9 of these 16 bits are used to define the conventional access permissions of the filesystem object, while 3 bits are used for special purpose security, which leaves four unused bits in the 16-bit access permission field.

Exemplary Extended Access Permissions

Figure 3:
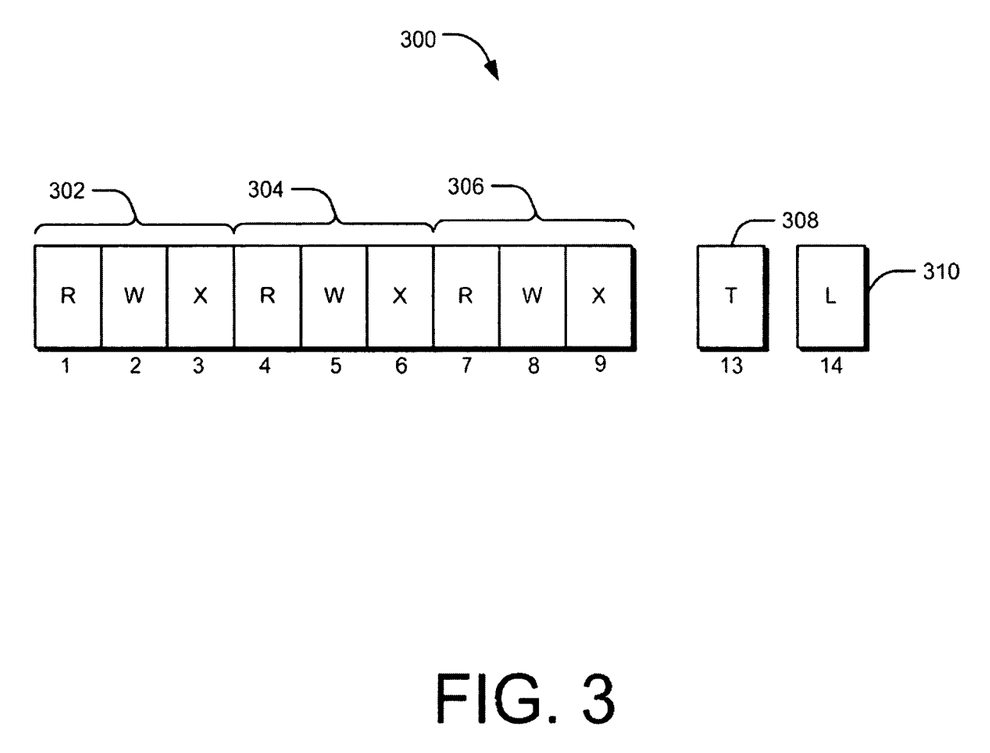
FIG. 3 illustrates exemplary extended access permissions according to some embodiments of the claimed invention.

FIG. 3 illustrates exemplary extended access permissions 300 according to embodiments of the claimed invention. The exemplary extended access permissions 300 include 11 bits as opposed to the conventional 9-bit access permissions explained above. Embodiments of the claimed invention utilize two of the four unused bits in the access permissions field. The first 9 bits of the extended access permissions 300 (that can be represented as three octal digits) are used to indicate owner mode bits 302, group on a trusted client mode bits 304, and other (everyone else) mode bits 306. Furthermore, embodiments of the claimed invention alter the definition of the mode bits. Typically, the second octal digit represented access permissions for group members, but according to the claimed invention, the second octal digit indicates access permissions for the group members accessing the object from the trusted clients 116. Further, the third octal digit 306 indicates permissions for other, rather than for others as done previously. In some implementations, the other mode bits 306 can be checked for owners on the non-trusted clients 118, group members on the non-trusted clients 118, or other users.

The tenth and eleventh bits can be a T bit 308 and an L bit 310 that are introduced in an embodiment of the claimed invention. The T bit 308 indicates whether the filesystem object was created on the trusted clients 116 or on the non-trusted clients 118. An enabled status (e.g., bit value 1) on the T bit 308 indicates that the filesystem object was created on the trusted clients 116, while a disabled status (e.g., bit value 0) on the T bit 308 indicates that the filesystem object was created on the non-trusted clients 118. In one implementation, the processing device can automatically set the T bit 308, once the object has been created. Further, in cases when the owner is allowed access to the object and the owner modifies the object from the trusted clients 116, the T bit 308 can be automatically enabled, if previously disabled.

The L bit 310 indicates whether the owner of an object is allowed access to the object, wherein the owner is a user on a non-trusted client 118. To this end, an enabled L bit 310 indicates that the owner is allowed access from the non-trusted client 118, while a disabled L bit 310 indicates that the owner is not allowed access from the non-trusted client 118. This bit is applied in special situations when the owner of a filesystem object creates a filesystem object on the trusted client 116, and wishes to access the filesystem object from another client, such as the non-trusted client 118. In these situations, the owner can enable the L bit 310, and add the client ID of the non-trusted client 118 in the inode of the object. Any number of non-trusted clients 118 can be added to the inode depending on the owner's requirement. Further, the owner can modify the list of the non-trusted clients 118 at any point of time.

In one implementation, the owner mode bits 302 can be overloaded based on the T bit 308, which means that access can be based on the owner mode bits 302 for different situations depending on the value of the T and L bits, and on the owner location. For example, if the T bit 308 is enabled (i.e., filesystem object was created on the trusted client 116) and the owner attempts to access the object from the trusted client 116, access will be based on the owner mode bits 302. On the other hand, if the owner makes an attempt to access the object from a non-trusted client 118, the owner will be allowed access based on the other mode bits 306. In situations when the L bit 310 is enabled and the owner endeavors to access the object from a non-trusted client 118 (and the non-trusted client ID is present in the inode of the object), the access will be determined based on the owner mode bits 302. In addition, if the filesystem object is created from the non-trusted client 118 (i.e., the T bit 308 is disabled) access to the owner of the object can be based on the owner mode bits 302 in both cases (i.e., from a trusted 116 or a non-trusted client 118).

If the object was created on a non-trusted client 118 (i.e., T bit is disabled), then access is not restricted only to the trusted clients 116, but users on the non-trusted clients 118 can access the object as well, based on their access mode bits. Further, in this case, the group at trusted client mode bits 304 can be read as group mode bits, and even group members on the non-trusted clients 118 can be assessed against these mode bits.

Since, access to a user 110 not only depends on the user ID, but also the client ID, the access permissions can vary dynamically for the user 110. Accordingly, based on the client ID, user ID, the T bit 308, and the L bit 310 of the extended access permissions 300, effective access permissions for an object can vary. For example, user 110-A working on the client 106-A owns a file "confidential.txt" with access permissions 755. When the user 110-A tries to access the file from the non-trusted client 118, such as client 106-D the access permissions of the object can dynamically change to 444.

Figure 4:
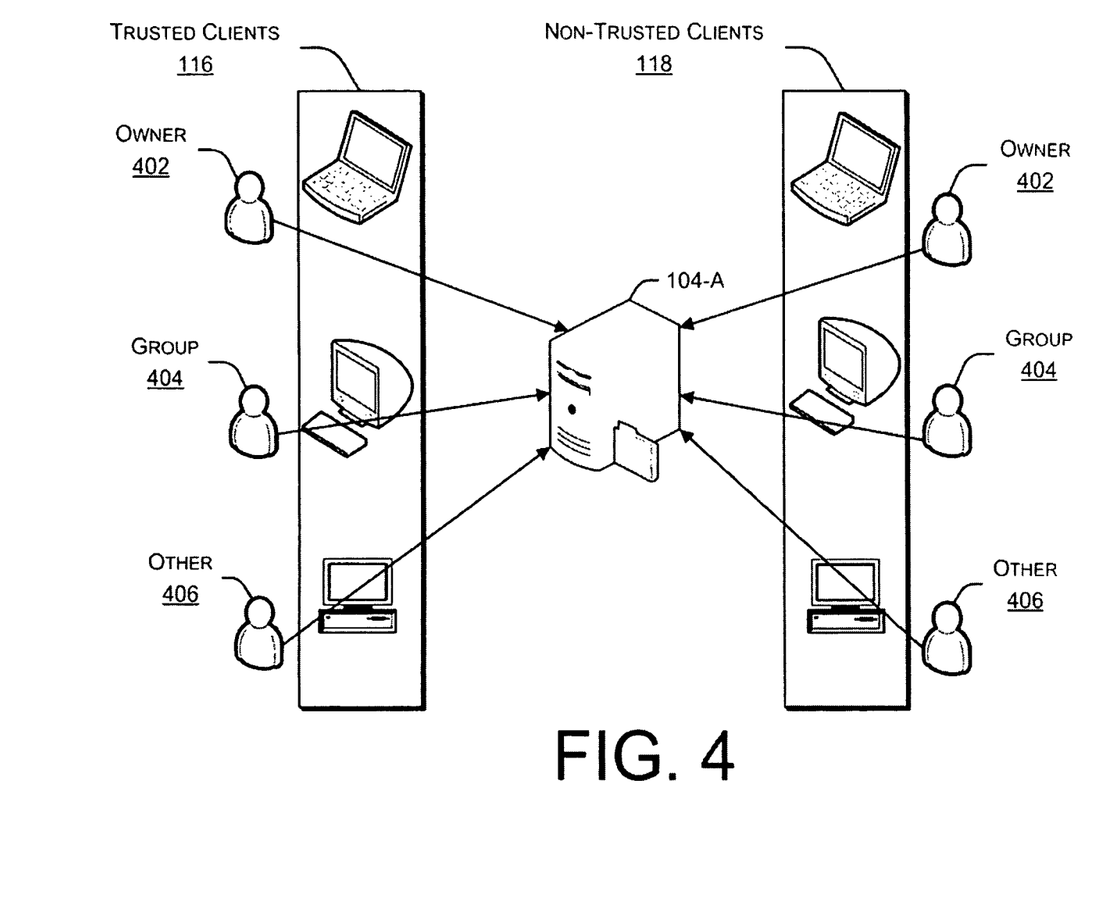
FIG. 4 is a diagram illustrating exemplary scenarios in which a user can be allowed or denied access to a filesystem object.

Turning now to FIG. 4, which illustrates some exemplary scenarios in which a user can be allowed or denied access to a filesystem object. FIG. 4 depicts a system 400 that includes the trusted clients 116 and the non-trusted clients 118. Further, each of the trusted clients 116 and the non-trusted clients 118 are connected to an exemplary filesystem server, such as the filesystem server 104-A. To illustrate the different scenarios further, an exemplary filesystem object is used. For instance, a filesystem object "confidential.txt" exists on the filesystem server 104-A. The extended access permissions 300 of the object can be the permissions depicted below in Example 1 (as described in connection with FIG. 3).

| 1 | 1 | 1 | 1 | 0 | 1 | 0 | 0 | 0 | 1 | 1 |
|---|---|---|---|---|---|---|---|---|---|---|

Example 1

Extended Access Permissions 300 of Filesystem Object—confidential.txt

The extended access permissions 300 of Example 1 indicate that the owner at trusted client has full permissions (111), the users in the group at trusted client have read and execute permissions (101), and other has no permissions (000). Further the extended access permissions 300 indicate that the file was created on a trusted client (T bit 308 is enabled) and the owner can access the file from a non-trusted client 118 (L bit 310 is enabled). The user requesting access to the filesystem object—confidential.txt can be the owner of the object, a member of the owners group, or any other user. When the user tries to access the object from the trusted clients 116, access will be based on the type of user. For example, when the user is an owner 402, access will be based on the owner mode bits 302 and the owner 402 will be allowed complete access to the file. When the user is in a group 404, the group at trusted client mode bits 304 will be assessed and the user will be allowed to read and execute the file. When the user is an other user 406, access will be based on the other mode bits 306 and the user will not be allowed access to the file.

Now in another scenario, when the user attempts to access the file "confidentical.txt" from a non-trusted client 118, a number of outcomes are possible. When the user is the owner 402, two situations are possible. In the first situation, the non-trusted clients ID is stored in the inode of the object, in this case, access will be based on the owner mode bits 302, and the owner 402 will be allowed access. In the second situation, the ID for the non-trusted client 118 is not stored in the inode of the object, in this case, access will be based on the other mode bits 306, and the owner 402 will not be allowed access to the file. According to the present example, the L bit 310 is enabled, but in case the L bit 310 was disabled, access would be based on the other mode bits 306 and the owner 402 would not be allowed access.

When the user is in the group 404, access will be based on other's permissions 306, and the user will not be allowed access to the file. Finally, when the user is the other user 406, access will be based on the other mode bits 306 and the user will not be allowed access, as the other mode bits 306 are 000.

Further, in another example, a filesystem object "salary.txt" can have extended access permissions 300 as depicted below in Example 2:

| 1 | 1 | 1 | 1 | 0 | 1 | 0 | 0 | 0 | 0 | 0 |
|---|---|---|---|---|---|---|---|---|---|---|

Example 2

Extended Access Permissions 300 of Filesystem Object—salary.txt

The extended access permissions 300 shown in Example 2 would indicate that the owner 402 created the file on the non-trusted client 118 (as the T bit 308 is disabled (0)). In this case, all users will be treated as if they were present on a trusted client 116, even if they were present on a non-trusted client 118, and access would be based on the access permissions of the first nine bits. However, if the owner 402 overwrites/replaces the file from the trusted client 116, the T bit 308 will automatically be set to one (enabled), and the file will be treated as if it were created on the trusted client 116.

Exemplary Methods

Figure 5:
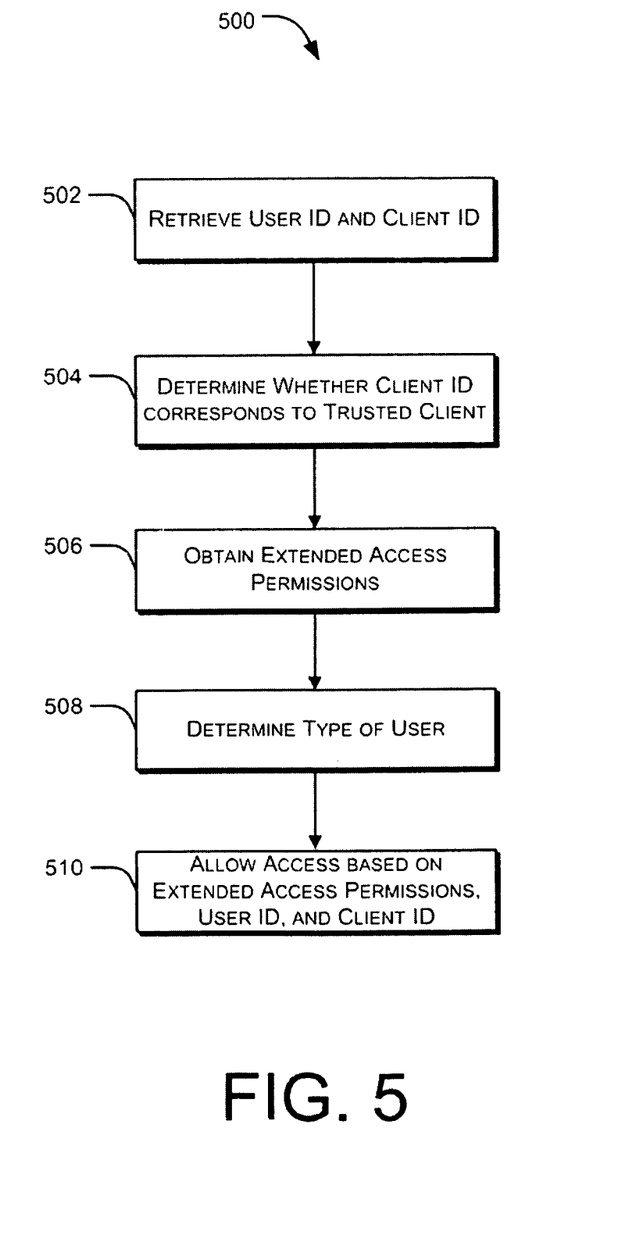
FIG. 5 is a flowchart of a method for providing access to filesystem objects in a distributed filesystem.

FIG. 5 illustrates an exemplary method 500 for providing access in the DFS 100 with reference to FIGS. 1 to 4. The method 500 includes steps for granting access to a requested filesystem object in the DFS 100. Further, the method 500 includes the steps of retrieving a user ID and a client ID, determining if a client is a misted client, looking up the extended access permissions 300 of the object, determining type of user, and providing access based on the extended access permissions 300, and the user location.

At step 502, the method 500 retrieves the user ID and the client ID of the requested user. The requesting user can be the user 110 requesting access to a filesystem object on one of the filesystem servers 104. In one embodiment, the filesystem server 104 can retrieve the client ID of the client 106 and compare the client ID with the list of the clients 106 present either in the central repository 108 or in the memory 112. In another embodiment, the filesystem server 104 can utilize the NIS to retrieve the list of clients and the client ID. If the client ID is present in the list of client IDs, the NIS or the filesystem server 104 proceeds to check the user's identification. If the user ID is present along with the client ID, the user can be authenticated; else, the user is not authenticated. In one implementation, the user ID can be a unique value obtained through a combination of the user ID and the client ID. In another implementation, the user ID can be any unique value.

At step 504, the method 500 can determine whether the client ID corresponds to a trusted client or a non-trusted client. In one embodiment, the filesystem server 104 can compare the client ID with the list of trusted clients stored in the central repository 108 or the memory 112. If the client ID is present in the trusted clients, the client is a trusted client; else, the client is a non-trusted client. Trusted Computing can maintain the list of the trusted clients 116 and the non-trusted clients 118. For example, the NIS can be utilized to determine whether the client ID corresponds to a trusted or non-trusted client.

Upon determining whether the client is a trusted or non-trusted client, the method 500 can look up the extended access permissions of the filesystem object at step 506. In one implementation, the processing device 114 of the filesystem server 104 can obtain the extended access permissions 300 from the vnode 204 of the filesystem object. In another implementation, the extended access permissions 300 can be obtained from the inode of the object.

Once the extended access permissions 300 are obtained, the processing device 114 can determine user type at step 508. In one implementation, the processing device 114 can determine the type of user from a list including owner, group member at trusted client, other user, owner at non-trusted client, or group member at non-trusted client. The filesystem server 104 can make the determination based on the user ID, the client ID, and the ownership information of the object. For example, if the user ID matches the owner ID in the inode of the object, and the client ID corresponds to the trusted client 116, the filesystem server can determine that the user is the owner at trusted client. In another example, if the user ID does not match the owner ID or the group ID of the filesystem object, the filesystem server 104 can determine that the requesting user is an other user.

At step 510, the filesystem server 104 can either allow or deny access to the requesting user based on the user ID, the client ID, and the extended access permissions. In one implementation, the filesystem server checks whether the filesystem object was created on the trusted client 116 and whether the user is allowed to access the filesystem object from the non-trusted client 118. In one implementation, the processing device 114 on the filesystem server 104 can check the T 308 and the L bit 310 of the extended access permissions 300 to determine whether the object was created on the trusted client 116 and whether a user on the non-trusted client 118 can access the object. Based on the determination, effective access permissions can be obtained for the object. The processing device 114 can evaluate the effective access permissions for the object each time the object is requested, based on the type of user and the extended access permissions 300 (as described in connection with FIG. 3). For example, if the type of user is group at trusted client, the filesystem sever 104 can provide access to the object based on the group at trusted client mode bits 304. The access is provided based on a set of access rules, which will be described in detail with reference to FIG. 6.

If at the output of the step 510, the requesting user is allowed access to the filesystem object, the filesystem object is retrieved and presented on the client 106. In one implementation, the inode number of the filesystem object can be checked to determine the location of the object on in the filesystem server 104. In another implementation, the vnode 204 of the filesystem object can be checked to determine the location of the object in the DFS 100. Further, the requesting user will be allowed access as defined by the access mode bits pertaining to him/her. For example, if a user 110 has just the read permissions, then the user 110 cannot write/modify or execute the object.

Figure 6:
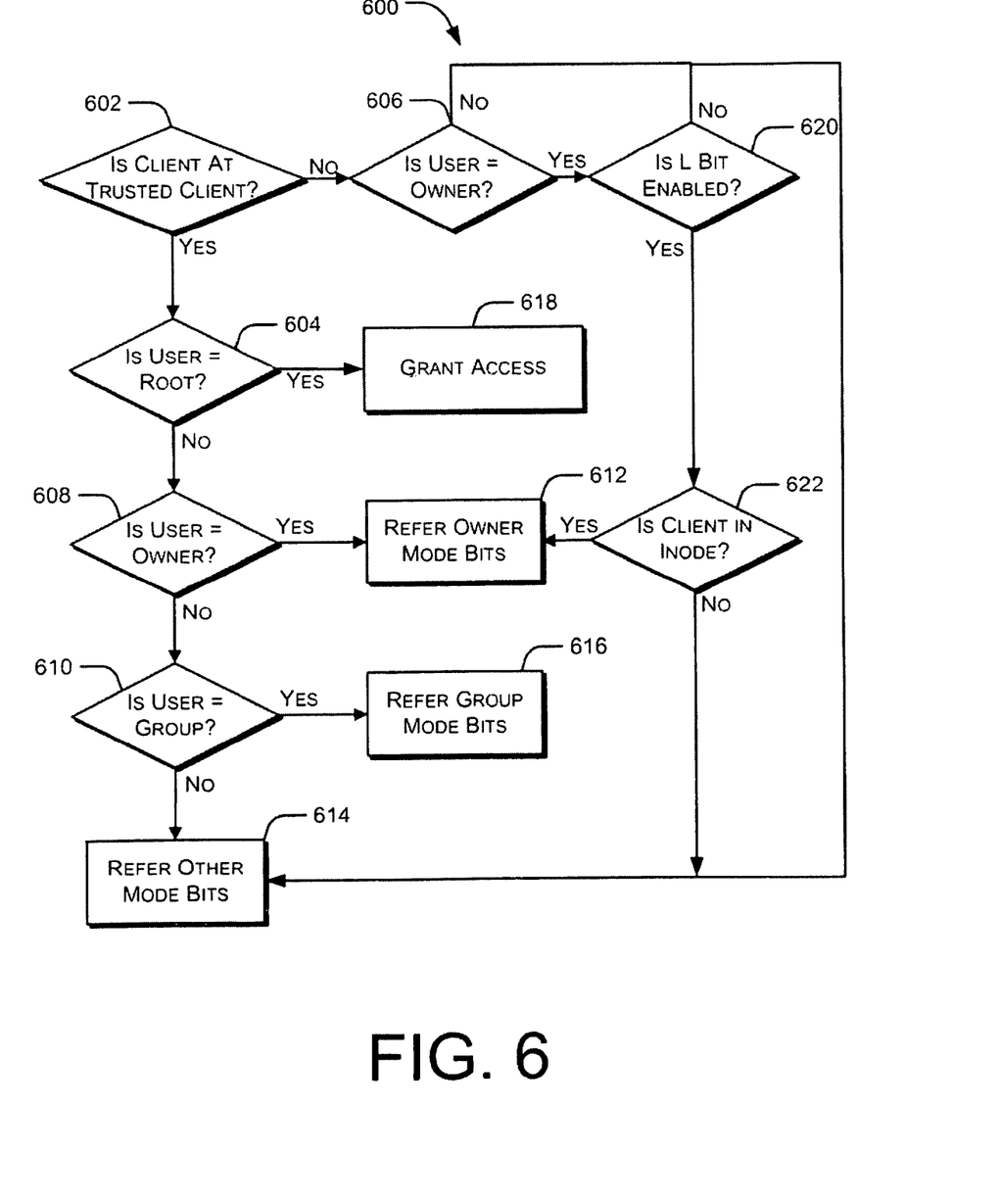
FIG. 6 is a flowchart of a method for determining access to a filesystem object in a distributed filesystem.

FIG. 6 is a flowchart illustrating an exemplary method 600 to determine whether a user should be granted access. The method 600 includes comparing the user ID and client ID with the access permissions to determine the accessibility.

At step 602, the method 600 determines whether the client is a trusted client 116. In one implementation, the NIS can check whether the client ID matches with a trusted client ID. The list of the trusted clients 116 can be obtained from the central repository 108 or from the filesystem servers 104. In one implementation, the processing device 114 can also check if the user ID of the requesting user 110 is present in a list of user IDs usually stored in memory of the client. In certain cases, the user IDs can also be stored along with the list of client IDs in the central repository 108 or in the memory 112.

If the client is a trusted client 116 ('yes' path from step 602), the processing device 114 of the server checks whether the user 110 is a root user (step 604), else the processing device 114 proceeds to check whether the user ID corresponds to the owner ID, at step 606.

At step 604, the method determines whether the user is a root user. The root user can be an administrator or a security advisor. The root user typically has all the access permissions in the DFS 100. If the user 110 is the root user, the method 600 moves to step 618 and the user 110 is granted access to the filesystem object irrespective of die extended access permissions 300 of the object. The processing device 114 can determine whether the user 110 is a root user based on the user ID.

If the user 110 is not the root user, the processing device 114 can check whether the user 110 is the owner 402 at step 608. In one implementation, the user ID can be verified against the owner ID of the object. In one implementation, the owner ID can be acquired from the inode/vnode 204 of the object. If the IDs match, it can be determined that the user 110 is the owner 402 of the object. If the user is the owner 402 ('yes' path from step 608), the processing device 114 can refer the owner mode bits 302 at step 612.

If the IDs do not match ('no' path from step 608) the processing device 114 can check if the user 110 belongs to the group 404 (at step 610). In one implementation, the processing device can check the group ID of the object in the object vnode 204/inode filesystem object. The users ID can be compared to the group ID of the object. If the user belongs to the group 404 mentioned in the vnode of the filesystem object, the group at trusted client mode, bits 304 can be referred (at step 616). If the user 110 has sufficient permissions based on the group at trusted client mode bits 304, the user 110 is allowed access to the object: else, the user 110 is denied access.

If the user 110 does not belong to the group 404, then the other mode bits 306 are referred at step 614. If the user 110 has access permissions based on the other mode bits 306, the user 110 is granted access to the object, else denied.

Further, at step 602, if the client was a non-trusted client 118, the method 600 proceeds to step 606. At step 606, a determination is made whether the user 110 is the owner 402 of the object. If the user is the owner 402 ('yes' path from block 606), the method moves to step 620, else the processing device 114 can refer the other mode bits 306 at step 614 ('no' path from block 606).

At step 620, the processing device 114 checks if the L bit 310 is enabled. If the L bit 310 is enabled ('yes' path from block 620) the method 600 moves to step 622, else the method 600 moves to step 614 ('no' path from block 606) and the mode bits of other 306 is checked before access can be granted to the user 110.

At step 622, the processing device 114 checks if the non-trusted client 118 is included in the vnode 204 of the object. If the non-trusted client 118 is mentioned in the vnode 204 of the object, the owner mode bits 302 are referred at step 612, else access is based on the other mode bits 306.

Further, in method 600, if the T bit is disabled (e.g., 0), then the access can be based on the first 9 bits of the extended access permissions and the extended access permissions can be read as conventional access permissions.

The description set out above describe particular embodiments only and is not intended to limit the invention, whose scope is determined solely by the claims set out below. As used here, singular forms "a", "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the claimed invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for providing access in a distributed filesystem, the method comprising:
    retrieving a user identification (ID) and a client ID of a requesting user, wherein the client ID corresponds with a client device;
    determining whether the client ID corresponds to at least one of a trusted client or a non-trusted client by comparing the client ID to a plurality of client IDs included in a list of clients that have been authenticated;
    obtaining extended access permissions of a filesystem object, wherein the extended access permissions include a T bit indicating whether the filesystem object was created on the trusted client, and an L bit indicating whether an owner of the filesystem object can access the filesystem object from the non-trusted client, wherein when the L bit is enabled, the owner is allowed access from the non-trusted client, and wherein when the L bit is disabled, the owner is not allowed access from the non-trusted client; and
    allowing access to the filesystem object based on the user ID, the client ID, and the extended access permissions of the filesystem object.

2. The method of claim 1, further comprising determining a type of the requesting user from a list including a root user, an owner on a trusted client, an owner on a non-trusted client, a group member on a trusted client, a group member on a non-trusted client, and an other user, based on the user ID, the client ID, and the filesystem object.

3. The method of claim 2, wherein the step of allowing access to the file system object comprises checking the extended access permissions corresponding to the type of the requesting user.

4. The method of claim 1, wherein the extended access permissions further comprises owner mode bits, group at trusted client mode bits, and other mode bits.

5. The method of claim 4, wherein the allowing further comprises granting access to the requesting user when the requesting user is a root user and the client ID corresponds to a trusted client.

6. The method of claim 4, wherein the step of allowing access to the filesystem object further comprises granting access based on the owner mode bits when the requesting user is an owner on a trusted client.

7. The method of claim 4, wherein the step of allowing access to the filesystem object further comprises granting access based on the owner mode bits when the requesting user is an owner on a non-trusted client, and the T bit is zero.

8. The method of claim 4, wherein the step of allowing access to the filesystem object further comprises granting access based on the other mode bits when the requesting user is an owner on a non-trusted client, the T bit is one, and the L bit is zero.

9. The method of claim 4, wherein the step of allowing access to the filesystem object further comprises granting access based on the owner mode bits when the requesting user type is an owner on a non-trusted client, the L bit is one, and the client ID is present in an inode of the filesystem object.

10. The method of claim 4, wherein the step of allowing access to the filesystem object further comprises granting access based on the other mode bits when the type of the requesting user is a group member on a non-trusted client.

11. The method of claim 4, wherein the step of allowing access to the filesystem object further comprises granting access based on the group member at trusted client mode bits when the type of the requesting user is a group member on a trusted client.

12. The method of claim 4, wherein the step of allowing access to the filesystem object further comprises granting access based on the other mode bits when the user is an other user.

13. A system for providing access in a distributed filesystem, the system comprising:
a memory that stores filesystem objects;
a processing device that:
retrieves a user ID and a client ID of a requesting user wherein the client ID corresponds with a client device:
determines whether the client ID corresponds to a trusted client or a non-trusted client by comparing the client ID to a plurality of client IDs included in a list of clients that have been authenticated;
obtains extended access permissions of a filesystem object, wherein the extended access permissions includes an L bit indicating whether an owner of the filesystem object can access the filesystem object from the non-trusted client, and a T bit indicating whether the filesystem object was created on the trusted client, wherein when the L bit is enabled, the owner is allowed access from the non-trusted client, and wherein when the L bit is disabled, the owner is not allowed access from the non-trusted client; and
allows access to the filesystem object based on the user ID, the client ID, and the extended access permissions of the filesystem object.

14. The system of claim 13, wherein a list of trusted clients and non-tnisted clients is stored in the memory.

15. The system of claim 14, wherein the list of trusted clients includes all clients having unique user IDs.

16. The system of claim 13, wherein trusted and non-trusted clients are determined based on trusted computing.

17. The system of claim 13, wherein a list of authorized trusted clients is stored in an mode of the filesystem object.

18. The system of claim 13, wherein the user ID is a combination of the user ID and the client ID.

19. The system of claim 17, wherein the a list of non-trusted clients is stored in the mode of the filesystem object, and wherein the owner can modify the list of non-trusted clients at any point of time.

* * * * *